April 21, 1959        H. V. SMITH        2,882,726
LIQUID MEASURING DEVICE
Filed Sept. 13, 1956        3 Sheets-Sheet 1

Horace V. Smith
INVENTOR.

BY *James F. Weiler*
*Jefferson D. Giller*
ATTORNEYS

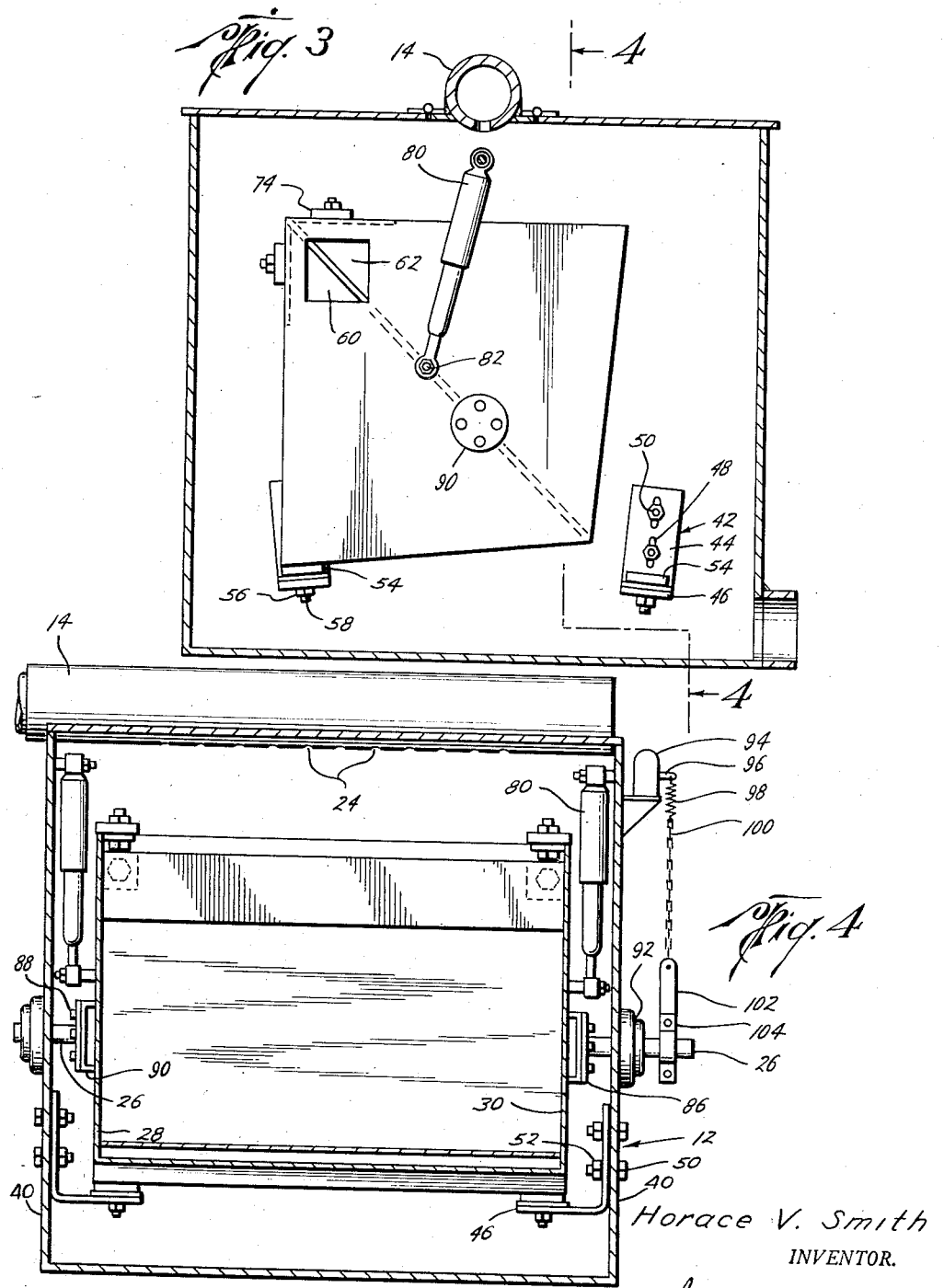

April 21, 1959     H. V. SMITH     2,882,726
LIQUID MEASURING DEVICE

Filed Sept. 13, 1956     3 Sheets-Sheet 3

Horace V. Smith
INVENTOR.

BY James F. Weiler &
Jefferson D. Giller
ATTORNEYS

United States Patent Office 2,882,726
Patented Apr. 21, 1959

2,882,726

LIQUID MEASURING DEVICE

Horace V. Smith, Houston, Tex., assignor to Oil Metering and Processing Equipment Corp., Houston, Tex., a corporation of Texas Application September 13, 1956, Serial No. 609,596

3 Claims. (Cl. 73—219)

This invention relates to a liquid measuring device and more particularly to one utilizing an oscillating bucket having two equal compartments.

Certain liquid measuring devices utilizing an oscillating bucket having two equal compartments have been developed. Such devices have equal compartments in the bucket so arranged that when one compartment is being filled with liquid the other one is dumping and upon the filling compartment becoming nearly full, the bucket oscillates so that this filled compartment dumps and the empty compartment moves into position for filling. However, such devices now in use do not dump each time at the same liquid volume in the filling compartment resulting in inaccurate metering. Additionally these devices also often encounter the problem of having the bucket becoming locked in one position so that oscillation no longer takes place.

It is therefore an object of the present invention to provide a liquid measuring device in which the bucket dumps when a definite volume of liquid has entered the filling compartment.

It is another purpose of this invention to provide a liquid metering or measuring device in which the bucket is so constructed that danger of locking in position and preventing oscillation is eliminated.

Further, oscillating buckets now in use cause considerable vibration and noise with the former increasing wear and the latter being objectionable in many uses. It is therefore a further object of the present invention to provide a liquid metering or measuring device utilizing shock absorbers to eliminate the vibration and noise caused by abrupt oscillations of the bucket.

Most liquid measuring devices utilizing oscillating buckets are rated to dump and measure a certain volume such as a quarter barrel, half barrel, etc. but as the weight of the liquid in each compartment of the oscillating bucket affects the dumped volume, changes in density of the liquid such as from water to oil will change the dumped volume and a bucket which was set to dump at one-half barrel for water will not dump at the same volume if oil is the liquid being measured. It is therefore a purpose of the present invention to provide a calibrating means so that the bucket will dump the same amount of liquid it is rated to dump even though liquids of different density are measured.

It is still a further object to provide such a calibrating means which can also be used to accurately calibrate the metered volume and which is simple to construct and dependable in use.

Additionally, many oscillating buckets now in use do not properly cleanse themselves on each dump and it is a still further object of the present invention to provide a bucket in which the dumping compartment will dump in such a position that all the liquid in it will quickly flow out flushing out solids when that compartment is dumped, without reducing the area of the compartment available to receive the incoming liquid.

And yet a further object of the present invention is to provide a novel and simplified counting assembly for counting the oscillations of the bucket.

Other and further objects, features and advantages of the present invention will appear as the description of the preferred example of the invention proceeds, which is given for the purpose of disclosure and which is taken in conjunction with the accompanying drawings, where like character references designate like parts throughout the several views, and where, Figure 1 is a perspective view of the liquid measuring device of the present invention.

Figure 3 is a view similar to Figure 2 with the left hand compartment dumping and the right hand compartment filling.

Figure 4 is a cross sectional view along the line 4—4 of Figure 3.

Figure 1:
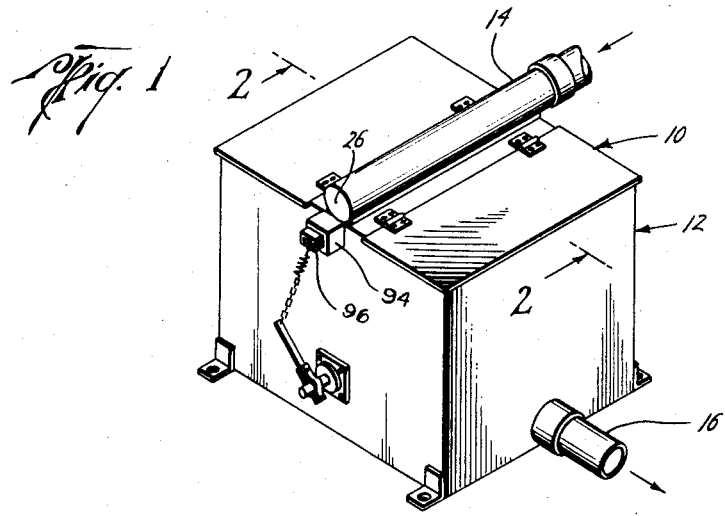
Figure 2:
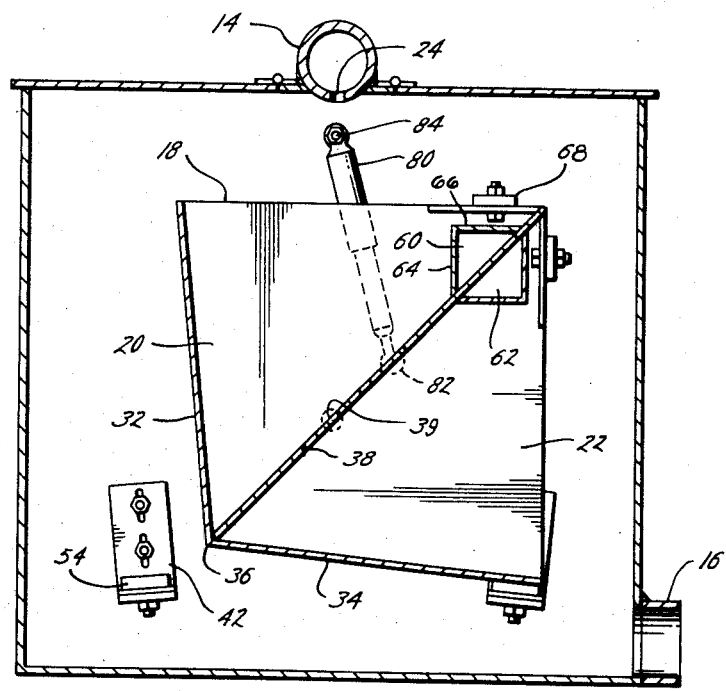
Figure 2 is a cross sectional elevation along the line 2—2 of Figure 1 illustrating the bucket with the right hand compartment dumping and the left hand compartment filling.

Referring now to the drawings and particularly to Figures 1 and 2, the liquid measuring device 10 as a whole comprises a bucket support means such as the housing 12 having liquid supply means such as the inlet pipe 14 across its top and liquid outlet means such as the outlet pipe 16 near the bottom. Located within the housing 12 and pivotally supported thereby for oscillating movement is the oscillating bucket 18 having two equal compartments with the left hand compartment being designated by the numeral 20 and the right hand compartment by the numeral 22.

The bucket support means may take any general shape but a housing 12 in the form of a rectangular solid is preferable for ease of construction. The inlet pipe 14 extends across the top of housing 12 with the lower portion of it protruding through the top of housing 12. Apertures 24 in the lower portion of the inlet pipe 14 over the bucket 18 permit liquid from the inlet pipe 14 to flow into the particular compartment 20 or 22 which happens to be in position for filling at the moment. Of course, one end 26 of this inlet pipe 14 is closed to insure that all liquid in it enters the bucket 18. The outlet pipe 16 may be located anywhere in the lower part of the housing 12 with the only requirement for this liquid outlet means being that it be located below the bucket 18 so that liquid leaving the bucket 18 will flow away from it.

As best seen in Figures 2, 3 and 4, the bucket 18 is pivotally suspended within the housing 12 by shafts 26 secured to the end walls 28 and 30 respectively of the bucket 18. The bucket, when viewed in cross section along the line of pivot, has two adjoining side walls 32 and 34 respectively joining at the apex 36 at greater than right angles. Extending upwardly from this apex is the dividing wall 38 which passes through the point of pivot 39 of the shafts 26 and extends to the top of the end walls 28 and 30 in such a manner that the bucket 18 is divided into the two equal compartments 20 and 22 with the point of pivot being on this dividing wall 38.

Located on the wall plates 40 of the housing 12 are the generally L-shaped stops 42, preferably four in number, with two of them supporting the sidewall 34 when compartment 22 is in the dumping position as illustrated in Figure 2 and the other two stops 42 supporting the sidewall 32 when compartment 20 is in the dumping position as illustrated in Figure 3. As best illustrated in Figures 2, 3 and 4, these stops 42 are adjustable in height to control the downward extent of movement of the sidewall of the dumping compartment contacting them. Each stop 42 has an upright leg 44 and a generally horizontal leg 46 at right angles to the upright leg 44. Formed in each upright leg 44 are a pair of generally vertical slots 48 through which slots 48 and a wall plate 40 extends bolts 50 having nuts 52. Loosening and tightening of the nuts 52 permit adjustment vertically of the stops 42. Of course other means for providing vertical adjustment may be used.

On the upper surface of the horizontal leg 46 is the shock absorbent pad 54 made of neoprene or some other shock absorbent substance. Preferably, this shock absorbent pad 54 is detachably secured to the horizontal leg 46 such as by a bolt 56 and nut 58 for ease of replacement of the pad 54.

When the bucket 18 is in the position illustrated in Figure 2 liquid flowing downwardly through the apertures 24 in the inlet pipe 14 will enter compartment 20 filling it until the center of gravity of the bucket 18 and the liquid in it is to be left of the pivot point 39 of the shafts 26 whereupon the bucket 18 will oscillate to the left moving the left hand compartment 20 into the dumping position shown in Figure 3 with this movement being limited by the stops 42. Liquid in this compartment 20 then flows out of it into the housing 12 and out the outlet pipe 16 while liquid coming downwardly through the apertures 24 in inlet pipe 14 fills the right hand compartment 22 which will in turn dump when the center of gravity of bucket 18 and the liquid in it shifts to the right hand side of the pivot point 39.

To prevent the bucket 18 from locking in one dumped position or the other and to require dumping at a definite liquid volume, identical liquid-tight chambers 60 and 62 are provided on each side of the dividing wall 38 near its top to break up the triangular cross-sectional configuration of each of the compartments 20 and 22 and keep liquid from those portions of the compartments so the center of gravity of the bucket 18 and the liquid in it will abruptly cross a vertical line passing through the pivot point 39 as will be explained later. While a retaining wall such as the wall 64 of liquid-tight chamber 60 (see Figure 2) rising vertically within the liquid would break up the triangular configuration of compartment 20 it is preferable to have the chamber liquid-tight such as by the use of the transverse wall 66 to prevent any spraying liquid from the apertures 24 in conduit 14 entering behind the wall 64 and thus nullifying its effect. The chambers 60 and 62 are identical so the volumes of compartments 20 and 22 are the same.

Figure 6:
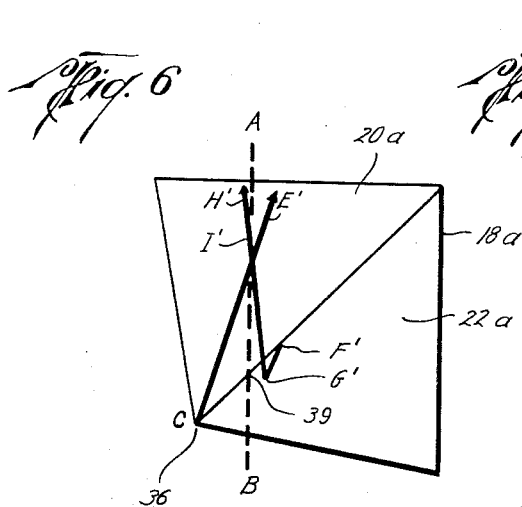
Figure 6 is a diagrammatic side elevation of an oscillating bucket without the liquid tight compartments of the present invention illustrating the center of gravity of the liquid in the filling compartment and the center of gravity of the bucket and liquid combined.
Figure 7:
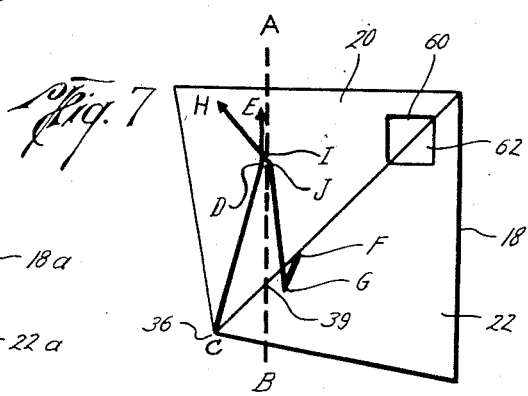
Figure 7 is a view identical to Figure 6 except that the bucket of the present invention with liquid tight compartments is shown.

Referring now to Figures 6 and 7, Figure 6 illustrates a bucket 18a without the liquid-tight chambers 60 and 62 while Figure 7 illustrates the bucket 18 of the present invention with the liquid-tight chambers 60 and 62. Liquid entering a compartment in the bucket 18a assumes the triangular configuration of the filling compartment such as compartment 20a and its center of gravity rises in the straight diagonal line C—E' crossing the vertical line A—B through the pivot point 39 during which time the center of gravity of the entire bucket 18a and the liquid in it follows the line F'—G'—H' with the leg G'—H' of this line F'—G'—H' being a straight line rising generally vertically and crossing the vertical line A—B at a very small angle in the vicinity of I'. The bucket 18a will theoretically oscillate to the left when the center of gravity of the bucket and liquid in it reaches the point I' but friction and other factors tending to resist oscillation will often prevent oscillation at this liquid level and will require more liquid in the compartment 20a to cause the bucket 18a to oscillate or may even cause it to lock in position after the compartment 20a has completely filled since the line G'—H' never passes very far to the left of the vertical line A—B.

With the use of the liquid-tight chambers 60 and 62 as best seen in Figure 7, this locking is prevented and oscillation of the bucket 18 is caused when a definite amount of liquid enters the filling compartment. With the use of these chambers 60 and 62 the center of gravity of the liquid filling a compartment such as compartment 20 moves diagonally upward along the line C—D in the same direction as along the line C—E' of Figure 6. However, when the liquid level in compartment 20 reaches the lower part of the liquid-tight chamber 60 the triangular configuration of the liquid in the compartment 20 is destroyed and the center of gravity of this liquid filling the compartment 20 rises vertically along the leg D—E. The center of gravity of the bucket 18 and the liquid entering its follows the same direction F—G as the path F'—G' in Figure 6 but instead of a generally straight leg G'—H' the leg G—H of Figure 7 is broken sharply at the point J and moved diagonally to the left along the leg J—H crossing the vertical line A—B at the point I at a much sharper angle than the line G'—H' of Figure 6. This change of direction of the line G—J—H at J is caused by the presence of the liquid-tight chamber 60 breaking the triangular configuration of the liquid filling compartment 20 and causing the center of gravity of the liquid filling the compartment 20 to move from the diagonal at the point D to the vertical line D—E.

Thus the center of gravity of the bucket 18 and the liquid in it abruptly crosses the vertical line A—B causing dumping of the bucket 18 at a definite liquid level resulting in accurate metering and the prevention of locking of the bucket 18.

Upon the filling of the right hand compartment 22 the liquid-tight chamber 62 will likewise force the bucket 18 to oscillate to the right at a definite liquid volume in compartment 22.

Figure 5:
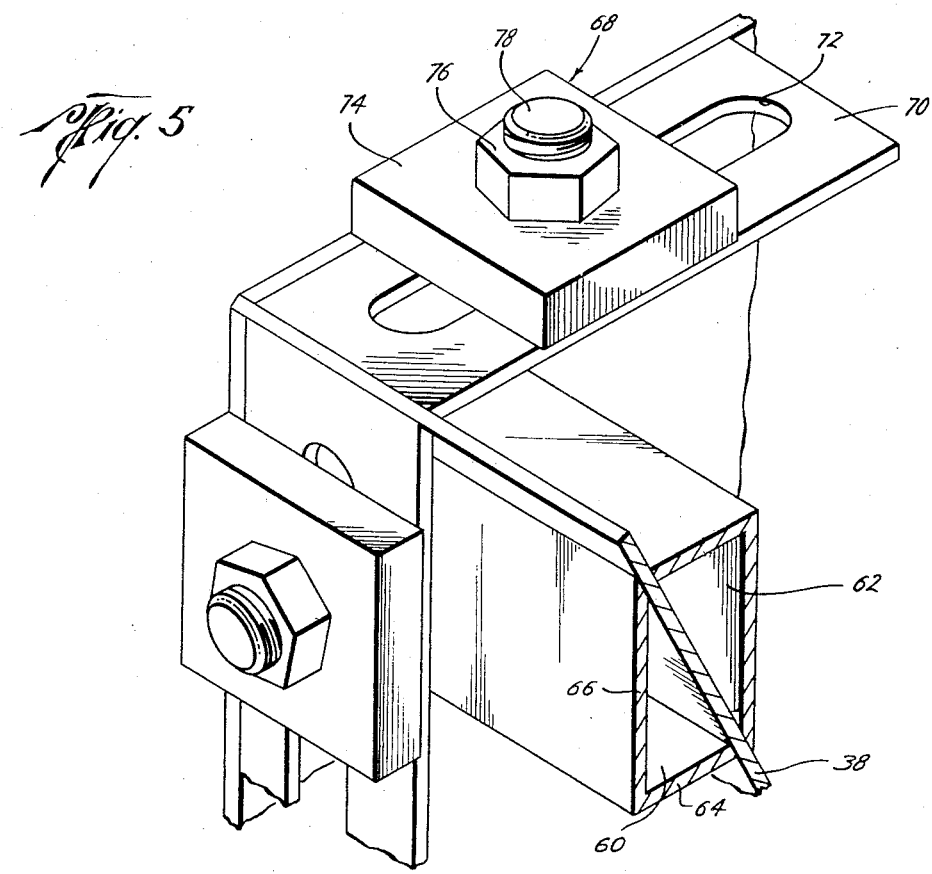
Figure 5 is an enlarged, fragmentary perspective view of the calibrating means of the present invention.

As best seen in Figure 5, calibrating means 68 are provided on the bucket 18 approximate the top of the dividing wall 38 and on each side thereof. Each calibrating means 68 includes the plate 70 secured such as by welding to an end wall and the upper edge of the dividing wall 38. Cut in the plate 70 is an elongated slot 72 extending away from the dividing wall 38 along which slot 72 the calibrating mass or weight 74 is movable toward and away from the dividing wall 38. This calibrating weight 74 is releasably secured in position such as by the threaded nut 76 on the bolt 78 extending upwardly from the lower side of plate 70 through the slot 72. Preferably four identical calibrating means 68 are utilized with one being at each side of the dividing wall 38 at each end wall 28 and 30 of bucket 18. By movement of the calibrating weights 74 toward and away from the dividing wall 38 the dumping volume of each compartment 20 and 22 may be individually and separately controlled so that the same volume of liquid will dump the bucket 18 even though liquids of different density may be used at various times. And, of course, these calibrating means 68 are used to accurately set the dumping volume at the desired volume for any particular liquid.

To reduce vibration and noise caused by the oscillation of the bucket 18 a single action shock absorber 80 is provided at each end of the bucket 18 with one end 82 of shock absorber 80 being secured to the bucket 18 at a point spaced from the pivot point 39 and on the dividing wall 38 and the other end 84 being secured to the housing 12 on a vertical line passing through the pivot point of the bucket 18. Single action shock absorbers such as those presently used on many models of Ford and Chevrolet automobiles may be used which shock absorbers retard movement in one direction and offer no resistance to movement in the other. The details of such shock absorbers are well known and no additional description of them is necessary. The shock absorbers illustrated in Figures 2, 3 and 4 offer no resistance to movement shortening their length but retard movement extending it. Thus, when the compartment 20 in Figure 2 reaches the dumping point and the bucket 18 pivots to the left there is no resistance by the shock absorbers 80 to the movement of the bucket compressing the shock absorbers 80 which occurs during the first part of the oscillation of the bucket but there is resistance to extension of the shock absorbers 80 which occurs after the end 82 of the shock absorbers 80 passes the vertical line passing through the pivot point. With this arrangement the dumping point of the bucket 18 is not affected but the violent downward movement of the dumping compartment is retarded thereby reducing noise and vibration. With certain sizes of buckets 18 a shock absorber 80 at one end of the bucket 18 only is satisfactory. Further, with certain small buckets it will be understood that the noise and vibration may not be sufficient to require a shock absorber 80.

Referring now to Figure 4, each of the shafts 26 which suspend the bucket 18 in the housing 12 has a flange 86 at its inner end which flange 86 is secured by bolts 88 to a bracket 90 welded on each end wall 28 or 30 at the dividing wall 38. Other arrangements for securing the shafts 26 to the bucket 18 may also be utilized. The outer ends of shafts 26 pass through apertures in the wall plates 40 of housing 12 where they are rotatably supported by anti-friction bearing assemblies 92 with a minimum of resistance to oscillation. A Link Belt F 220 non-restrictive bearing manufactured by Link Belt Company, 519 North Holmes Avenue, Indianapolis, Indiana, is an anti-friction bearing assembly which is quite satisfactory.

To count the oscillations of the bucket 18 a counting assembly is provided which includes a mechanical counter (see Figures 1 and 4) 94 secured to the housing 12 vertically above an extension of one of the shafts 26. Any conventional mechanical counter such as those presently manufactured by Durant Manufacturing Company of Milwaukee, Wisconsin or by Veeder-Root, Inc. of Hartford, Connecticut may be used. Such mechanical counter 94 includes an actuator 96 extending therefrom to which actuator 96 is secured linkage including a coil spring 98 secured to the actuator 96, a chain 100 fastened to the other end of the spring 98, and an arm 102 secured to the shaft 26 such as by clamps 104 and to the chain 100. As thus constructed, the arm 102 will oscillate with the shaft 26 and as it moves from side to side will actuate the counter 94 with the oscillations being indicated on the dial of the counter 94.

In operation, liquid entering through inlet pipe 14 flows into whichever compartment 20 or 22 is uppermost, such as compartment 20 in Figure 2, and fills it to a predetermined level. As the sidewalls 32 and 34 join at greater than right angles the sidewall of the compartment being filled, such as a sidewall 32 in Figure 2, does not pass to the right of a vertical line drawn through the apex 36 so there is a full opening at the top of compartment 20 for liquid to flow into the compartment 20 and at the same time the sidewall 34 slants downwardly from the horizontal so that all liquid in the dumping compartment 22 quickly flows out carrying with it any solids that might be in the liquid whereby the dumping compartment 22 cleanses itself.

As the liquid rises in the filling compartment 20 the liquid-tight chamber 60 insures that the center of gravity of the bucket 18 and the liquid in it will shift abruptly to the left of the pivot point 39 of the bucket 18 thereby causing accurate metering and preventing any locking of the bucket 18 in position. As the bucket oscillates so that it assumes a position shown in Figure 3, the shock absorbers 80 contract during the initial part of the oscillation without offering resistance to such movement and retard movement of the bucket after the dividing wall 38 has passed the vertical thus preventing slamming of the sidewall 32 on stops 42 whereby noise and vibration are eliminated. Upon the sidewall 32 resting upon the stops 42 liquid continuously entering through apertures 24 fills compartment 22 while compartment 20 empties itself and upon the liquid level in compartment 22 reaching a predetermined point the bucket 18 oscillates back to the position shown in Figure 2. Liquid dumped from the bucket 18 flows outwardly through the outlet pipe 16. Upon each oscillation of the bucket the shaft 26 acting through the linkage of the arm 102, the chain 100, and the spring 98 moves the actuator 96 on the counter 94 recording each such oscillation.

The desirable extent to which the sidewalls 32 and 34 slant downwardly upon dumping is controlled by adjusting the height of the stops 42 which also help absorb the shock of the dumping action. Additionally, movement of the calibrating masses or weights 74 toward and away from the dividing wall 38 adjusts the dumping volume for changes in density of liquids being measured and to insure that each compartment in the bucket 18 dumps at the proper point for each particular liquid.

As pressure of the atmosphere around the bucket 18 does not influence the operation of the liquid measuring device 10 it may be operated at atmospheric pressure or under pressures greater or less than atmosphere pressures such as in pressure or vacuum vessels.

The present invention therefore is well suited to carry out the objects and attain the advantages mentioned as well as others inherent herein.

While only a single example of the apparatus has been given for the purpose of illustration, changes in many details and rearrangements of the parts will suggest themselves to those skilled in the art. Accordingly, it is desired to be limited only by the spirit of the invention as defined by the scope of the appended claims.

What is claimed is:

1. An apparatus for measuring liquids comprising a bucket support means; an oscillating bucket pivotally supported by the bucket support means and provided with, when viewed in cross section along the line of pivot, two adjoining sidewalls and a dividing wall extending upwardly from the line formed by the adjoining of the sidewalls through the line of pivot so that the bucket is divided into two compartments adapted to be alternately filled with liquid to a predetermined level at which level the center of gravity of the bucket and liquid in the bucket causes oscillation of the bucket; liquid supply means above the bucket; a liquid-tight chamber in each compartment adjacent the dividing wall at said predetermined level; calibrating means on the bucket including calibrating masses slidably secured to the bucket proximate the top of the dividing wall for movement toward and away from said dividing wall and means to releasably secure the calibrating masses in position; stops on the bucket support means limiting downward movement of each sidewall; and a counting assembly actuated by the bucket recording oscillations of the bucket.

2. In an apparatus for measuring liquids including bucket support means and an oscillating bucket pivotally mounted by the bucket support means and provided with two adjoining compartments separated by a dividing wall, said compartments adapted to be alternately filled with liquid to a predetermined level at which level the center of gravity of the bucket and liquid in the bucket causes oscillation of the bucket, the improvement comprising a liquid-tight chamber in each compartment adjacent the dividing wall at said predetermined level; calibrating means on the bucket including calibrating masses slidably secured to the bucket proximate the top of the dividing wall for movement toward and away from the dividing wall and means to releasably secure the calibrating means in position; and a single action shock absorber at at least one end of the bucket secured to the bucket at a point on the dividing wall and to the bucket support means whereby downward movement of the point of connection of the shock absorber to the bucket is retarded.

3. In an apparatus for measuring liquids, said apparatus including an oscillating bucket pivotally mounted and two compartments in the bucket separated by a common wall, said compartments adapted to be alternately filled with liquid to a predetermined level at which level the center of gravity of the bucket and liquid in the bucket causes oscillation of the bucket, the improvement comprising a liquid tight chamber in each compartment adjacent the common wall at said predetermined level.

References Cited in the file of this patent

UNITED STATES PATENTS

| | | |
|---|---|---|
| 394,440 | Bender et al. | Dec. 11, 1888 |
| 668,875 | Hedemann | Feb. 26, 1901 |
| 690,820 | Arthur | Jan. 7, 1902 |
| 827,920 | Kitts | Aug. 7, 1906 |
| 1,038,327 | Englebright | Sept. 10, 1912 |
| 1,197,311 | Walsh | Sept. 5, 1916 |
| 1,815,658 | Simpson | July 21, 1931 |